United States Patent
Cowley et al.

(10) Patent No.: US 7,065,337 B2
(45) Date of Patent: Jun. 20, 2006

(54) TUNER FOR DIGITAL TERRESTRIAL BROADCAST SIGNALS

(75) Inventors: Nicholas Paul Cowley, Wiltshire (GB); Scott Cuthbertson, South Wales (GB); Matthew Timothy Aitken, Wiltshire (GB)

(73) Assignee: Zarlink Semiconductor Limited, Wiltshire (GB)

( * ) Notice: Subject to any disclaimer, the term of this patent is extended or adjusted under 35 U.S.C. 154(b) by 443 days.

(21) Appl. No.: 10/619,672

(22) Filed: Jul. 14, 2003

(65) Prior Publication Data

US 2004/0058660 A1    Mar. 25, 2004

(30) Foreign Application Priority Data

Jul. 16, 2002   (GB)   ................. 0216450.7

(51) Int. Cl.
*H04B 1/06*    (2006.01)
*H04B 7/00*    (2006.01)

(52) U.S. Cl. ............ 455/266; 455/302; 455/307; 455/340

(58) Field of Classification Search ............. 455/266, 455/339, 340, 179.1, 180.1, 185.1, 188.1, 455/193.1, 302, 307, 255, 258–260, 265
See application file for complete search history.

(56) References Cited

U.S. PATENT DOCUMENTS

| | | | |
|---|---|---|---|
| 4,435,841 A | 3/1984 | Dobrovolny | |
| 5,179,730 A * | 1/1993 | Loper | 455/266 |
| 5,940,143 A | 8/1999 | Igarashi et al. | |
| 5,963,856 A | 10/1999 | Kim | |
| 6,029,052 A * | 2/2000 | Isberg et al. | 455/131 |
| 6,112,070 A | 8/2000 | Katsuyama et al. | |
| 6,161,004 A * | 12/2000 | Galal et al. | 455/302 |
| 6,909,882 B1 * | 6/2005 | Hayashi et al. | 455/84 |
| 6,915,121 B1 * | 7/2005 | Python et al. | 455/266 |
| 2004/0087279 A1* | 5/2004 | Muschallik et al. | 455/73 |
| 2004/0266376 A1* | 12/2004 | Cowley et al. | 455/150.1 |

FOREIGN PATENT DOCUMENTS

| | | |
|---|---|---|
| EP | 0 766 418 | 9/1997 |
| GB | 2 350 948 | 6/1999 |
| WO | 01/41424 | 6/2001 |

OTHER PUBLICATIONS

Search Report regarding corresponding Great Britain Application No. 0216450.7 dated Feb. 26, 2003.

* cited by examiner

*Primary Examiner*—Nguyen T. Vo
(74) *Attorney, Agent, or Firm*—Renner, Otto, Boisselle and Sklar, LLP

(57) ABSTRACT

A single conversion tuner is provided for receiving digital terrestrial broadcast signals. The tuner comprises a single frequency changer comprising a mixer and local oscillator controlled by a PLL synthesiser. A non-alignable variable low pass filter is provided between the tuner input and the mixer, which is of the image reject type. The bandwidth of the filter is varied so as to track the local oscillator frequency to provide sufficient attenuation of the image channel without requiring any alignment during manufacture.

8 Claims, 3 Drawing Sheets

TUNER FOR DIGITAL TERRESTRIAL BROADCAST SIGNALS

The present invention relates to a tuner for digital terrestrial broadcast signals.

Known tuners for digital terrestrial applications are based on a single conversion architecture. The broadband input signal from the aerial is divided into a number of bands, typically three bands, and filtered by a number of filter stages. This filtering limits intermodulation product generation and attenuates the image frequency of a selected channel so that substantially only the lower sideband is converted to a standard relatively low intermediate frequency.

The single frequency changer comprises a mixer and local oscillator, generally controlled by a phase locked loop synthesiser. The filters preceding the mixer are of bandpass type and have a relatively narrow passband which is arranged to track the local oscillator frequency over the reception band covered by the frequency changer. Because of the inevitable tolerances in filter components, the filters have to be aligned during manufacture and this is typically achieved by adjusting elements within the local oscillator tuned circuit and the filters, either manually or by the use of robotics. The filters have to track over a relatively wide frequency range, typically more than one octave, so that the accuracy of filter characteristics such as passband ripple, bandwidth and out of band attenuation are a compromise for each channel in the band.

For analog reception, the compromises in the filter characteristics are acceptable because channels are generally broadcast on a grid such that there is channel guard-banding. In particular, the channels of each broadcast group are generally spaced apart by several channel spacings. This reduces spill from interfering channels through the filters as a result of non-perfect filter bandwidth and hence reduces intermodulation in the mixer. Also, the image channel is greatly attenuated ahead of the mixer.

In the case of digital terrestrial broadcasts, the digital channels are located in the guard bands between analog channels. The possibility of unwanted analog channels passing through the filtering is thus increased. This is compounded by the fact that the digital channels are at substantially lower levels, typically by up to −35 dB for the two adjacent channels on each side of an analog channel.

Although conventional single conversion tuners may be used for receiving digital terrestrial channels, the demands on the filtering ahead of the mixer are increased. This requires careful alignment during manufacture and makes it difficult to integrate a tuner on a motherboard of a digital terrestrial television receiver containing intermediate frequency and baseband processing.

GB 2 350 948, U.S. Pat. No. 6,112,070, U.S. Pat. No. 5,963,856 and U.S. Pat. No. 5,940,143 disclose receivers for TV or mobile radio use with a tracking bandpass filter ahead of the first or only frequency changer. WO 01/41424 acknowledges the problems in aligning such a tracking bandpass filter and proposes a technique whereby the filter is "mechanically aligned" during manufacture and then fine-tuned on the basis of bit error rate whenever a new channel selection is made.

U.S. Pat. No. 4,435,841 discloses a non-bandpass switched filter ahead of a first frequency changer. The filter is switchable between high pass and low pass operation with the same nominal turnover frequency.

EP 0 766 418 discloses a DBS tuner of single conversion type supplying a demodulator in the form of a quadrature direct-to-baseband converter. A variable low pass filter is disclosed ahead of the frequency changer and receives the same control voltage as the local oscillator from a phase locked loop.

According to the invention, there is provided a single conversion tuner for digital terrestrial broadcast signals, comprising: a single frequency changer comprising a mixer and a local oscillator and a variable low pass filter between the mixer and a tuner input, characterised in that: the frequency changer is arranged to convert any selected channel to a non-zero output intermediate frequency for demodulation; the mixer is an image reject mixer; the local oscillator is arranged to supply to the mixer a local oscillator signal whose frequency is substantially equal to the sum of the frequency of the selected channel and the output intermediate frequency; and the low pass filter is non-alignable and is arranged to track the frequency of the local oscillator such that the turnover frequency of the low pass filter is greater than the frequency of the selected channel and less than the sum of the frequency of the selected channel and twice the output intermediate frequency.

The low pass filter may be arranged to provide at least 15 dB of attenuation at the sum of the frequency of the selected channel and twice the output intermediate frequency.

The tuner may comprise a digital/analog converter for controlling the low pass filter and a memory containing a look-up table for receiving a channel request and for supplying filter tuning data to the converter.

The tuner may comprise a non-alignable high pass filter having a variable bandwidth between the tuner input and the frequency changer. The turnover frequency of the high pass filter may be arranged to track the frequency of the local oscillator such that the turnover frequency of the high pass filter is greater than the frequency of the selected channel.

The tuner may comprise a variable gain stage, such as a low noise amplifier, between the tuner input and the low pass filter.

The tuner may comprise a band limit filter between the tuner input and the low pass filter.

It is thus possible to provide a single conversion tuner which is suited to receiving digital terrestrial broadcast signals and which may be formed on the motherboard of a receiver. Adequate filtering performance ahead of the frequency changer can be achieved without requiring an alignment procedure during manufacture. Cost and size may therefore be reduced.

The present invention will be further described, by way of example, with reference to the accompanying drawings, in which.

Like reference numerals refer to like parts throughout the drawings.

Figure 1:
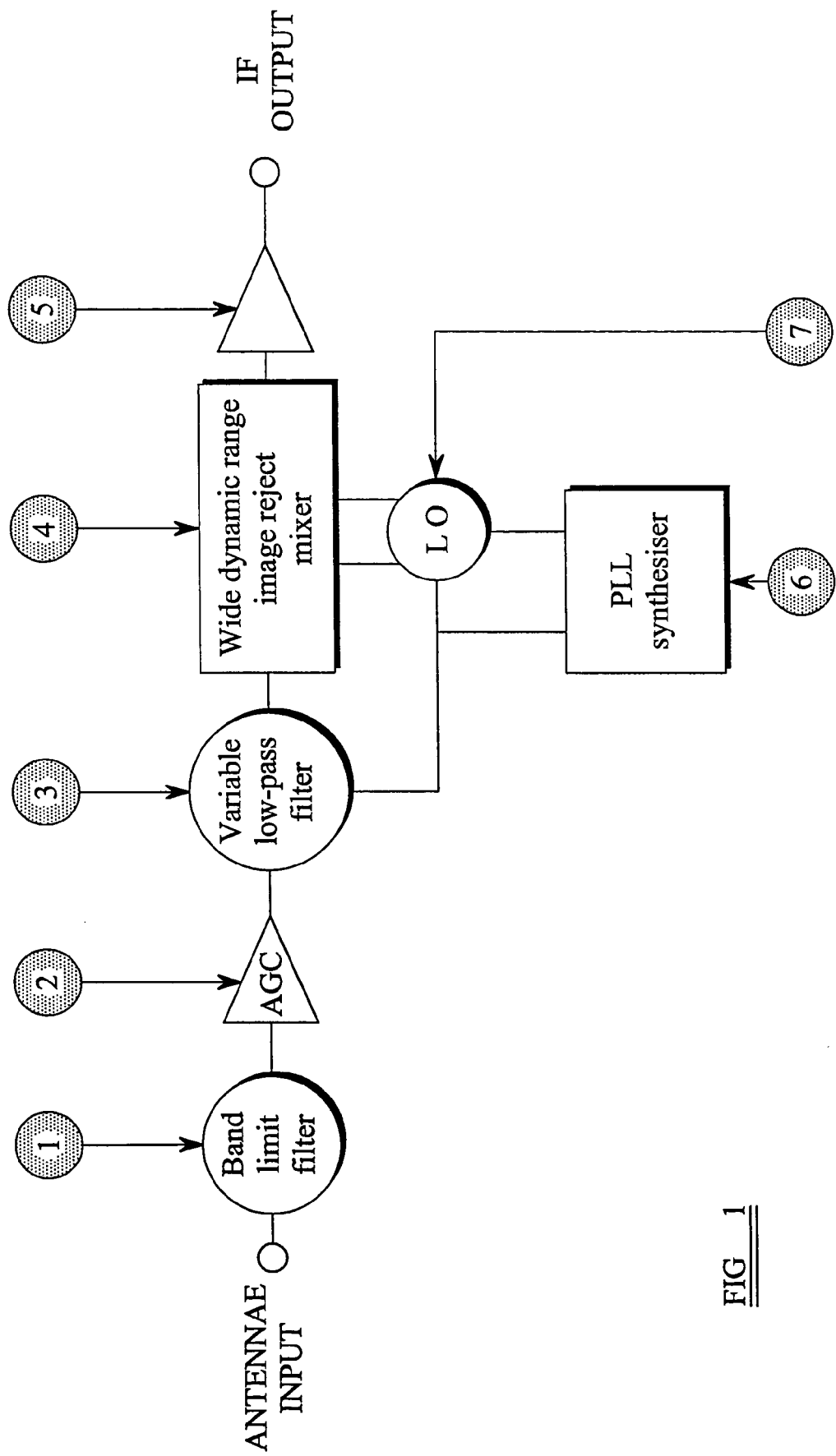
FIG. 1 is a block schematic diagram of a tuner constituting a first embodiment of the invention.

The tuner shown in FIG. 1 is of the single conversion type for receiving digital terrestrial broadcast signals. The tuner has an antennae input connected to a band limit filter 1, which is of the fixed type and limits the amount of out of band energy entering the tuner. The output of the filter 1 is connected to the input of an automatic gain control (AGC) arrangement 2 which incorporates a low noise amplifier (LNA) for defining the tuner input noise figure (NF). The arrangement 2 provides gain so as to buffer the input noise figure from the noise contributions of the following stages of the tuner. AGC is provided to reduce the composite amplitude of the received band in strong signal conditions.

The output of the arrangement 2 is connected to the input of a variable low pass filter, whose function is to provide attenuation of the upper sideband or image. The filter 3 is of relatively simple type and does not require any alignment during manufacture. The output of the filter is supplied to an image reject mixer 4 having a wide dynamic range. The mixer 4 receives quadrature signals from a local oscillator (LO) 7 controlled by a phase locked loop (PLL) synthesiser 6, which also controls the turnover frequency of the filter 3. The synthesiser 6 is controlled so as to select a desired channel for reception and the local oscillator frequency is selected to be equal to the sum of the channel frequency and the intermediate frequency. The turnover frequency of the filter 3 (i.e. the frequency at which the filter provides 3 dB of attenuation) is set so as to be above the channel frequency but below the image channel frequency, which is equal to the sum of the local oscillator frequency and the intermediate frequency (equal to the sum of the channel frequency and twice the intermediate frequency).

In another embodiment, the arrangement 2 may be disposed after the filter 3. Also, in some embodiments, the filter 1 may be omitted.

The image reject mixer 4 converts the desired channel to the non-zero intermediate frequency and this is supplied to the IF output of the tuner by an amplifier 5. The mixer 4 typically provides about 30 dB of attenuation or suppression of the image channel and its wide dynamic range results in the generation of relatively low distortion products in the presence of unwanted interfering signals. In particular, the filter 3 provides little or no attenuation of channels adjacent the selected channel so that a relatively large composite signal amplitude may be present at the input of the mixer 4.

In order to achieve acceptable performance with digital terrestrial broadcast signals, image rejection of approximately 45 dB is required within the tuner. The mixer 4 provides about 30 dB of image rejection so that the filter 3 is required to provide only about 15 dB of image rejection. Thus, the filter 3 may be of relatively simple type without requiring alignment during manufacture.

Figure 2:
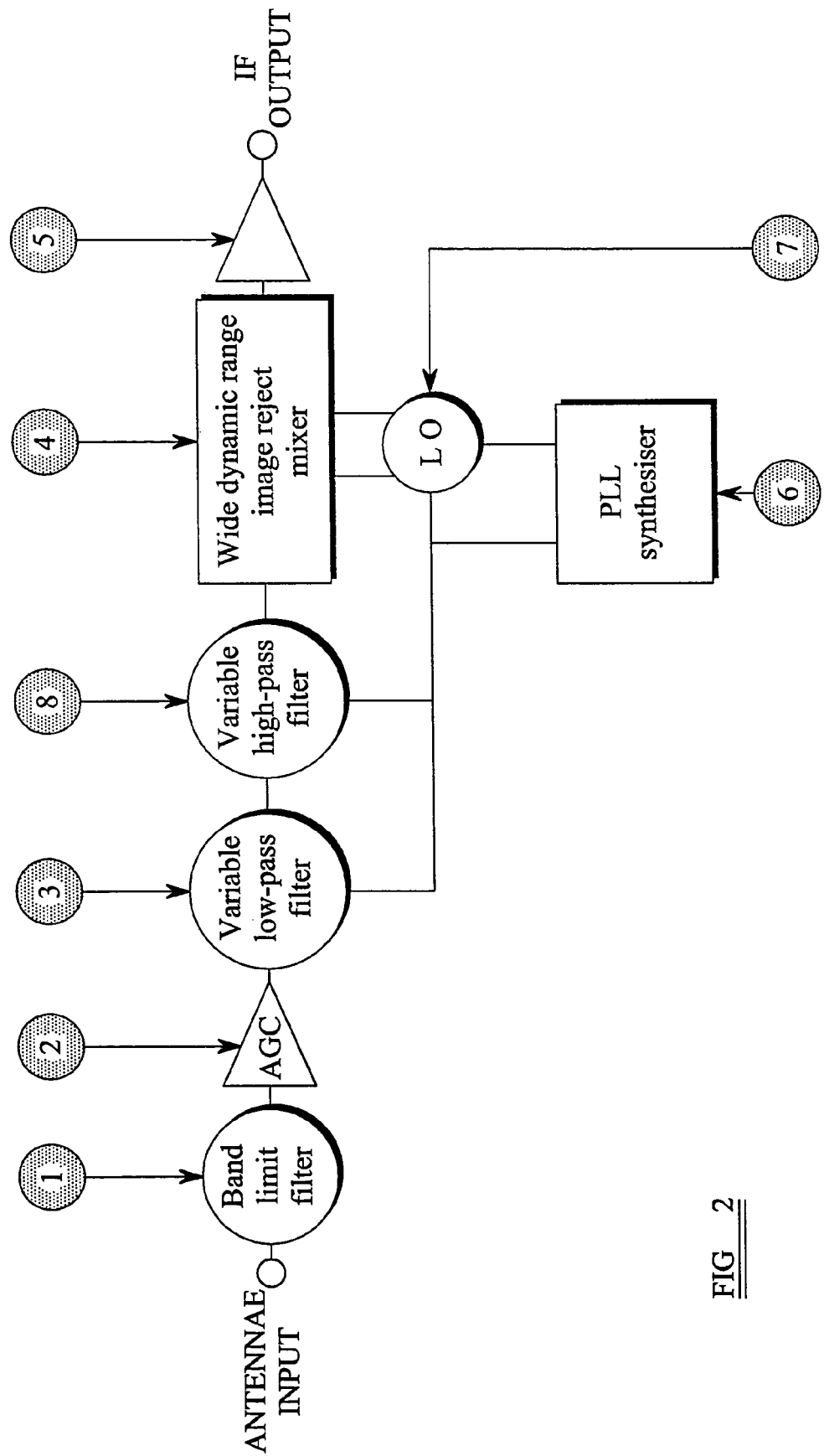
FIG. 2 is a block schematic diagram of a tuner constituting a second embodiment of the invention.

The tuner shown in FIG. 2 differs from that shown in FIG. 1 in that a variable high pass filter 8 is provided between the filter 3 and the mixer 4. The filter 8 further reduces the level of potentially interfering signals so that the intermodulation performance of the mixer 4 may be relaxed. The filter 8 may also be of relatively simple type and does not require alignment during manufacture because accurate tracking of the local oscillator frequency is not necessary. The turnover frequency of the filter 8 is controlled so as to be less than the selected channel frequency.

Figure 3:
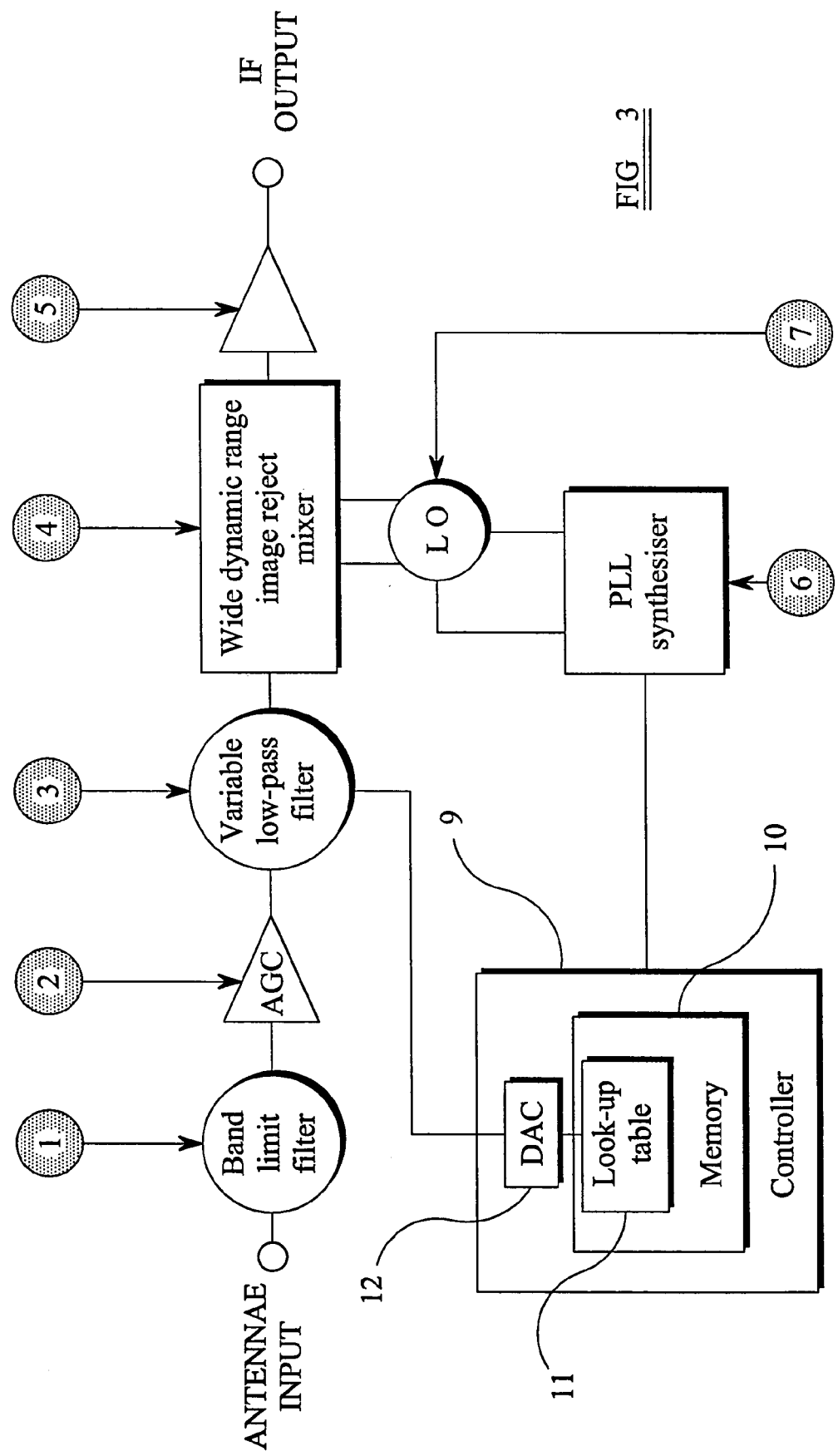
FIG. 3 is a block schematic diagram of a tuner constituting a third embodiment of the invention.

In the tuners shown in FIGS. 1 and 2, the variable filtering ahead of the mixer is shown as being controlled by the synthesiser 6. FIG. 3 illustrates an alternative arrangement in which a tuner of the type shown in FIG. 1 is provided with a controller 9, which controls the synthesiser 6 and the filter 3. For example, the controller 9 receives a request from a user for reception of a selected channel and supplies data to the synthesiser 6 for controlling the frequency of the local oscillator 7 to have the appropriate value. The controller 9 comprises a memory 10 containing a look-up table 11, whose output is supplied to a digital/analog converter (DAC). The output of the DAC 12 controls the variable low pass filter 3. In particular, the look-table is effectively addressed by the request for the selected channel and contains data for controlling the turnover frequency of the filter 3 such that the selected channel is passed substantially without attenuation (other than the insertion loss of the filter 3) whereas the image channel is attenuated by at least 15 dB. The filter 3 is not required to track the local oscillator frequency within narrow limits so that no alignment during manufacture is necessary in order for the filter to provide the necessary minimum image channel attenuation. A similar arrangement may be provided for controlling the filter 8 of FIG. 2.

It is thus possible to provide at low cost a tuner which has acceptable performance for receiving digital terrestrial broadcast signals. The tuner may be made relatively compact and is capable of being formed on a receiver motherboard. No alignment is necessary so that the cost of manufacture is substantially reduced.

The invention claimed is:

1. A single conversion tuner for digital terrestrial broadcast signals, comprising:
    a tuner input;
    a single frequency changer for converting any selected one of a plurality of channels to a non-zero output intermediate frequency for demodulation, said frequency changer comprising an image reject mixer and a local oscillator arranged to supply to said mixer a local oscillator signal having a frequency which is substantially equal to a sum of a frequency of said selected channel and said output intermediate frequency; and
    a non-alignable low pass filter disposed between said tuner input and said frequency changer, having a turnover frequency and being arranged to track said frequency of said local oscillator such that said turnover frequency of said low pass filter is greater than said frequency of said selected channel and less than a sum of said frequency of said selected channel and twice said output intermediate frequency.

2. A tuner as claimed in claim 1, in which said low pass filter is arranged to provide at least 15 decibels of attenuation at said sum of said frequency of said selected channel and twice said output intermediate frequency.

3. A tuner as claimed in claim 1, comprising a digital/analog converter for controlling said low pass filter and a memory containing a look-up table for receiving a channel request and for supplying filter tuning data to said converter.

4. A tuner as claimed in claim 1, comprising a non-alignable high pass filter having a turnover frequency and a variable bandwidth between said tuner input and said frequency changer.

5. A tuner as claimed in claim 4, in which said turnover frequency of said high pass filter is arranged to track said frequency of said local oscillator such that said turnover frequency of said high pass filter is less than said frequency of said selected channel.

6. A tuner as claimed in claim 1, comprising a variable gain stage between said tuner input and said low pass filter.

7. A tuner as claimed in claim 6, in which said variable gain stage comprises a low noise amplifier.

8. A tuner as claimed in claim 1, comprising a band limit filter between said tuner input and said low pass filter.

* * * * *